US010093506B2

(12) United States Patent
Chretien et al.

(10) Patent No.: US 10,093,506 B2
(45) Date of Patent: Oct. 9, 2018

(54) BRAKING DEVICE FOR A TAPE REEL (71) Applicant: BOBST MEX SA, Mex (CH)

(72) Inventors: Julien Chretien, Métabief (FR);
Christophe De Gaillande, Les
Monts-de-Corsier (FR)

(73) Assignee: BOBST MEX SA (CH)

(*) Notice: Subject to any disclaimer, the term of this patent is extended or adjusted under 35 U.S.C. 154(b) by 395 days.

(21) Appl. No.: 14/902,737

(22) PCT Filed: Jun. 20, 2014

(86) PCT No.: PCT/EP2014/001690
§ 371 (c)(1),
(2) Date: Jan. 4, 2016

(87) PCT Pub. No.: WO2015/000558
PCT Pub. Date: Jan. 8, 2015

(65) Prior Publication Data
US 2016/0167911 A1 Jun. 16, 2016

(30) Foreign Application Priority Data
Jul. 1, 2013 (EP) .................................. 13003323

(51) Int. Cl.
B65H 23/06 (2006.01)
F16D 55/38 (2006.01)
F16D 121/06 (2012.01)

(52) U.S. Cl.
CPC ........... B65H 23/063 (2013.01); F16D 55/38 (2013.01); B65H 2301/5126 (2013.01);
(Continued)

(58) Field of Classification Search
CPC .. F16D 55/38; F16D 2055/0058; F16D 55/40; B65H 23/063; B65H 2301/5126
(Continued)

(56) References Cited

U.S. PATENT DOCUMENTS 3,004,732 A * 10/1961 Fischer ................ B65H 23/063
242/118.62
4,709,872 A * 12/1987 Hammer .............. B65H 23/063
242/421.6
(Continued)

FOREIGN PATENT DOCUMENTS

EP 0 236 702 A1 9/1987
EP 0 790 209 A1 8/1997
(Continued)

OTHER PUBLICATIONS

International Search Report dated Sep. 24, 2014 issued in corresponding International patent application No. PCT/EP2014/001690.

Primary Examiner — Michael R Mansen
Assistant Examiner — Mark K Buse
(74) Attorney, Agent, or Firm — Ostrolenk Faber LLP (57) ABSTRACT A braking device 1 is provided for a tape reel mounted rotatably about its axis. The braking device 1 includes two rotating members 10, 20 rotationally coupled with the reel, and a selection member 30 configured to cooperate by friction selectively with either one of the rotating members 10, 20 by moving the selection member to engage one or the other rotating member for friction braking.

17 Claims, 4 Drawing Sheets (52) U.S. Cl.
CPC ............. *B65H 2403/7253* (2013.01); *B65H 2403/7255* (2013.01); *B65H 2403/93* (2013.01); *B65H 2406/40* (2013.01); *F16D 2121/06* (2013.01)

(58) Field of Classification Search
USPC ............. 242/421, 422, 423, 423.1, 423.2; 188/71.5
See application file for complete search history.

(56) References Cited

U.S. PATENT DOCUMENTS

| | | | | |
|---|---|---|---|---|
| 4,844,371 A * | 7/1989 | Tahara | ............. | B65H 23/063 242/421.1 |
| 5,325,949 A * | 7/1994 | Dommett | ............. | F16D 13/75 188/196 A |
| 5,503,349 A * | 4/1996 | Chertok | ............. | B65H 23/063 242/422.2 |
| 5,758,841 A * | 6/1998 | Ayffre | ............. | B65H 75/245 242/423.1 |
| 6,073,876 A * | 6/2000 | Suzuki | ............. | B65H 19/1821 242/421.6 |
| 6,293,192 B1 * | 9/2001 | Bartlett | ............. | B65H 19/1821 101/212 |
| 8,800,726 B2 * | 8/2014 | Achrekar | ............. | F16D 13/385 188/71.3 |
| 2004/0221961 A1 * | 11/2004 | White | ............. | B65H 23/063 156/391 |
| 2008/0185239 A1 * | 8/2008 | Hakon | ............. | F16D 55/42 188/71.5 |
| 2009/0242336 A1 * | 10/2009 | Homma | ............. | F16D 55/30 188/71.5 |
| 2013/0206532 A1 * | 8/2013 | Achrekar | ............. | F16D 13/385 192/48.601 |

FOREIGN PATENT DOCUMENTS

| | | |
|---|---|---|
| EP | 0 987 205 | 3/2000 |
| EP | 1 004 528 A1 | 5/2000 |
| WO | WO 2012/116781 | 9/2012 |

* cited by examiner

BRAKING DEVICE FOR A TAPE REEL

CROSS-REFERENCE TO RELATED APPLICATIONS

The present application is a 35 U.S.C. §§ 371 national phase conversion of PCT/EP2014/001690, filed Jun. 20, 2014, which claims priority of European Patent Application No. 13003323.6, filed Jul. 1, 2013, the contents of which are incorporated by reference herein. The PCT International Application was published in the French language.

The present invention relates to a device for braking rotation of a rotatably mounted tape reel, particularly to slow down or stop unreeling of the reel.

The invention finds a particularly advantageous but not exclusive application for the manufacture of packaging for the luxury goods industry.

It is known to print texts and/or patterns by stamping, that is, by depositing by applying pressure on a sheet-like substrate of a colored or metalized film obtained from one or several stamping tapes, which are commonly referred to as metalized tapes. In the industry, such a transfer operation is conventionally performed by a platinum press in which the printing substrates are introduced one sheet at a time, while each stamping tape is continuously supplied.

Each stamping tape is in the form of a reel which is rotatably mounted on itself and is unreeled by a feed shaft which directly pulls the tape. This feed shaft is designed to rotate at a variable speed since tape feeding is performed sequentially within the platinum press. However, since the reel has a relatively large mass and therefore large inertia, it is particularly difficult for it to follow such a sequence of accelerations, decelerations and timed operations.

PRIOR ART

In order to overcome this difficulty, a conventional solution is to dissociate rotation of the reel from rotation of the feed shaft, by forming a reserve amount of tape between these two rotating members. For this purpose, it is customary to use a tape unwinding system which is capable of both storing the tape in a pre-unwound form downstream of the reel and delivering a correct length of pre-unwound tape upon each activation of the feed shaft. Owing to the presence of the reserve amount of tape in an intermediate position, it is advantageously possible to unreel the reel at a substantially constant speed, while the feed shaft may operate at a variable speed. The patent documents WO 2012/116781 and EP 0987205 disclose such tape unwinding systems.

In this type of configuration, the reel is generally not freely rotatable. To ensure an optimum tape tension, the reel is in fact permanently braked by applying a braking torque to it, and the intensity of the braking torque is regularly lowered as unreeling is performed. Among known braking devices in the prior art are those which perform their function by clamping the rotatably mounted reel between two flanges which are rotationally fixed, but are pressed against the sides of the reel.

This type of braking device has the drawback that it damages the edges of the tape, since braking is performed by direct friction between the flanges and the sides of the reel. Moreover, it proves to be not very precise for generating the desired tape tension, since the braking action is the result of the friction between the flanges and the sides of the reel, while the edges of the tape are not necessarily uniform.

In order to overcome all these problems, the idea has occurred to perform the braking function directly in the region of the support tube around which the tape is wound. Two sleeves are used for this purpose, each inserted at a respective end of the tube in question and being moreover rotatably mounted in relation to a fixed support. The actual braking action is generated by several friction disks. A part of each disk is fixed to one of the sleeves, while the other part of the disk is fixed to the reel support. An adjusting wheel is provided so that more or less pressure is applied between the different friction disks.

This kind of braking device unfortunately offers a relatively limited field of application. It in effect proves to be unsuitable for generating a high braking torque, such as torque required to stop rotation of the reel in the event of emergency stoppage. In fact it can really be used only to produce low braking torques, i.e. solely in order to perform tape tensioning, which moreover is on relatively small-size and/or low-weight reels. Finally, such a braking device requires regular adjustment to modulate the braking torque depending on the actual inertia of the reel, wherein the inertia tending naturally to decrease as the reel is unwound.

SUMMARY OF THE INVENTION

The technical problem to be solved by the object of the present invention is to propose a device for braking a tape reel rotatably mounted about its axis, wherein the device is able to avoid the problems of the prior art by offering a performance which is substantially better in terms of both precision and range of use, without damaging the tape.

According to the present invention, the braking device comprises two rotating members rotationally coupled with the reel, and a selection member arranged to cooperate by friction selectively with either one of the rotating members.

The term "member" may refer to both a simple component which is used only to exert an action and/or perform a given function, such as disk-type brake disk, and to a complex assembly composed of several components which act together in order to exert a common action and/or perform the same function, such as a series of clutch disks of a multi-disk system. This comment is applicable both to the selection member and to each rotating member, but also to the complementary friction member which will be described further below.

Moreover, the fact that the selection member cooperates by friction with each rotating member means, on the one hand, that it is mounted rotationally fixed in relation to each of them when at least the contact is effective and, on the other hand, that it is also able to be kept at a distance from the rotating members so as not to cooperate by friction with either member.

The invention as defined has the advantage of proposing two different braking capacities within a same device. It is consequently possible to define two different braking levels to be able to respond effectively to entirely dissimilar operating situations. It is thus possible to imagine a braking device which produces low braking torques and can rapidly generate high braking torques with precision.

Basically, the two brakes will never be used simultaneously, but always only separately depending on the type of braking action required. It is thus possible, for example, to use one of the brakes to slow rotation of the reel in a continuous manner in order to control the tape tension and the other brake to stop rotation suddenly in order to halt production prior to changing a reel or to perform an emergency stoppage following a technical problem.

BRIEF DESCRIPTION OF THE DRAWINGS

The present invention concerns the characteristic features which will emerge from the description below and which may be considered individually or in all their possible technical combinations. This description is of a non-limiting example intended to illustrate the nature of the invention and how it may be realized. The description refers to the attached drawings in which.

DETAILED DESCRIPTION OF PREFERRED EMBODIMENTS

Figure 1:
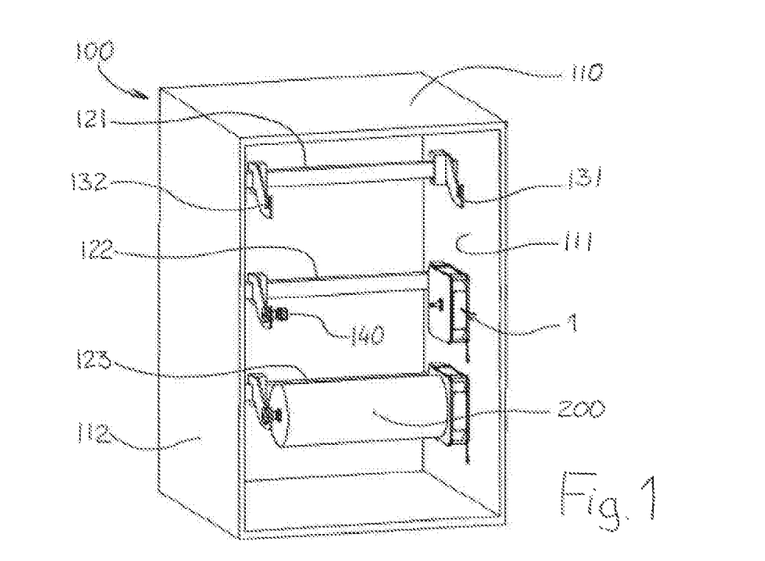
FIG. 1 shows a reel-holder cabinet, with two stations equipped with braking devices according to the invention.

FIG. 1 shows a reel-holder unit 100 for a machine for performing printing by stamping, namely a machine to deposit, by pressure on a series of sheet-like substrates, colored or metalized film obtained from one or more stamping tapes. The unit 100 has the function of holding different reels 200 to supply the machine with stamping tapes.

The reel-holder unit 100 comprises a frame 110 which supports three stations each housing one or more tape reels 200. Each station is comprised of a cross-piece 121, 122, 123, respectfully, which is fixed horizontally between the vertical side walls 111, 112 of the frame 110 and which is a support for fastening to at least one pair of reel-holder arms 131, 132. Each reel-holder arm 131, 132 is mounted slidably along its respective cross-piece 121, 122, or 123 to be displaceable transversely and thus adaptable to the transverse position as well as to the width of the reels 200 which are associated with the arms.

The reel-holder unit 100 is also equipped with braking devices 1, each configured to brake the rotation of a tape reel 200 mounted rotatably about the axis of the reel, with a view to controlling unreeling of the tape reel during the different operating stages of the stamping machine. In the layout shown for example in FIG. 1, only the intermediate or middle and the bottom stations have such a braking device 1, while the top station does not have one.

As can be seen for example in the region of the middle station, each braking device 1 is fixed to the free end of one of the reel-holder arms 131, while the other arm 132 simply supports a rotatably mounted support 140. Advantageously, the two braking devices 1 present in FIG. 1 are positioned on the same side of the unit 100 so as to be located as close as possible to a compressed-air source (not shown) which is necessary for respective operation of said devices and which is common.

In order for a braking device 1 to be able to perform its function, it must be rotationally coupled with the reel 200 as can be seen in the bottom station of the reel-holder unit 100. Basically, the reel 200 is mounted rotatably between the two reel-holder arms 131, 132 by means of engagement of its two ends with a movable part of the braking device 1 on one side and with the rotating support 140 on the other side.

Figure 2:
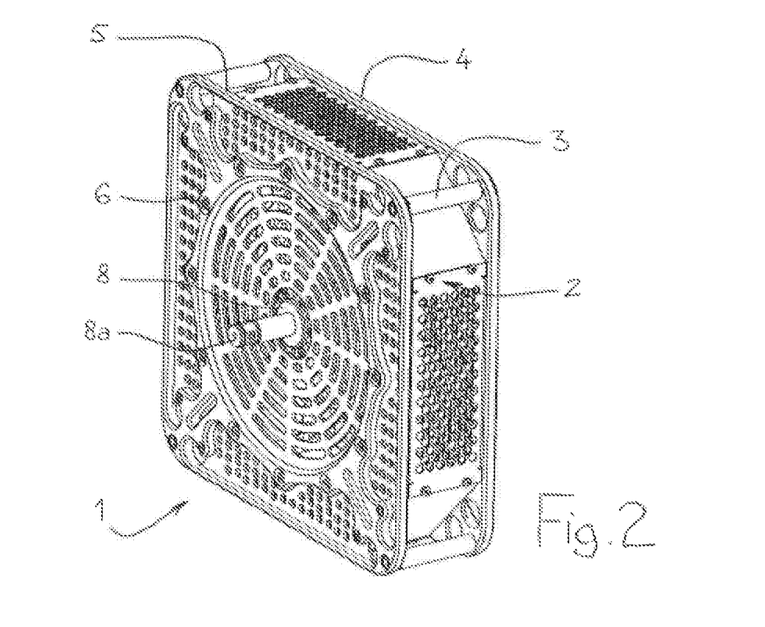
FIG. 2 is a perspective view of one of the braking devices.

In FIG. 2, in this particular embodiment chosen as an example, each braking device 1 is externally defined by a frame 2 having a substantially parallelepiped form, allowing it to be stably positioned when it is not mounted, but simply placed on a flat surface. The braking device 1 has moreover gripping handles 3 which are mounted on the four corners of the frame 2 so as to facilitate handling thereof when it is not fixed to the free end of a reel-holder arm 131.

Figure 3:
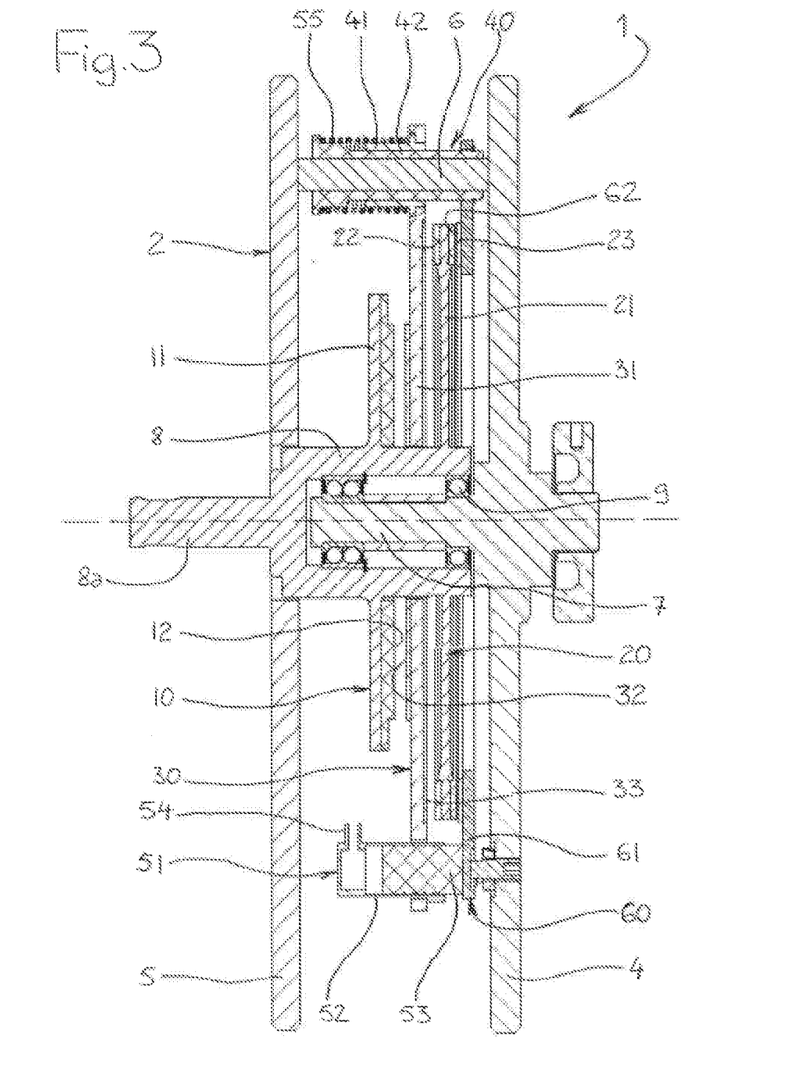
FIG. 3 shows the braking device in a simplified cross-section, i.e. without background.

As can be seen more clearly in FIG. 3, the frame 2 is comprised of two side-walls 4, 5 which are rigidly connected together by twelve struts 6 which are distributed in a circle (FIG. 2) and by the four handles 3 mentioned above. The whole forms a rigid structure which forms the essential part of the static portion of the braking device 1, namely the part intended to be rigidly fixed to the reel-holder arm 131.

The side-wall 4 is placed in proximity to the reel-holder arm 131. The side wall 4 is provided at its center with a projecting portion which extends perpendicularly to the side-wall inside the frame 2 and defines a hub 7 to support the movable part of the braking device 1. The opposite side-wall 5, which is arranged to extend facing the reel 200. The side wall 5 is itself recessed in its central zone so that the movable part of the braking device 1 is accessible from the outside, despite the fact that it is almost completely incorporated inside the frame 2.

The movable part of the braking device 1, which is intended to be rotationally coupled with the reel 200, comprises a rotor 8 which is mounted rotationally movable about the hub 7, by means of several ball roller bearings 9. The assembly is arranged so that the distal end 8a of the rotor 8 protrudes by a significant distance from the frame 2. The rotor 8 is therefore able either to act directly as a support for any reel 200 with a substantially complementary internal cross-section or to receive a sleeve with a larger cross-section and thus act indirectly as a support for any reel 200 with a bigger internal cross-section.

The braking device 1 includes two rotating members 10, 20 which are intended to be rotationally coupled with the reel 200, along the axis of rotation of the reel. The braking device is also includes a selection member 30 which is mounted rotationally fixed in relation to the two rotating members 10, 20 and which is movable to cooperate by friction selectively with either one of the rotating members 10, 20.

As its names implies, this selection member 30 is intended to activate or deactivate the braking function and, if necessary, choose between the two types of brake available. Each braking member 10, 20 defines the braking capacity of each type of brake. This capacity is in particular dependent on the number, the size, the position and/or the structure of the different friction surfaces involved. In this embodiment, the rotating member 10 corresponds to a slowing-down brake able to slow down continuously rotation of the reel 200 to generate an optimum tape tension, while the rotating member 20 corresponds to a stopping brake capable of suddenly stopping rotation, particularly in the event of an interruption in production or an emergency stoppage.

In detail, each rotating member 10, 20 is substantially in the form of a disk 11, 21, namely a flat and circular element which is mounted so as to be rotationally movable in relation to a central axis and which has, depending on the circumstances, one or two annular friction surfaces 12, 22, 23. In this sense, each rotating member 10, 20 is fairly similar to a motor-vehicle brake disk. The two rotating members 10, 20 are mounted here in a rotationally integral manner since the two disks 11, 21 are directly fixed to the rotor 8. They are moreover arranged parallel to each other in planes which are perpendicular to the axis of rotation of the reel 200.

Figure 4:
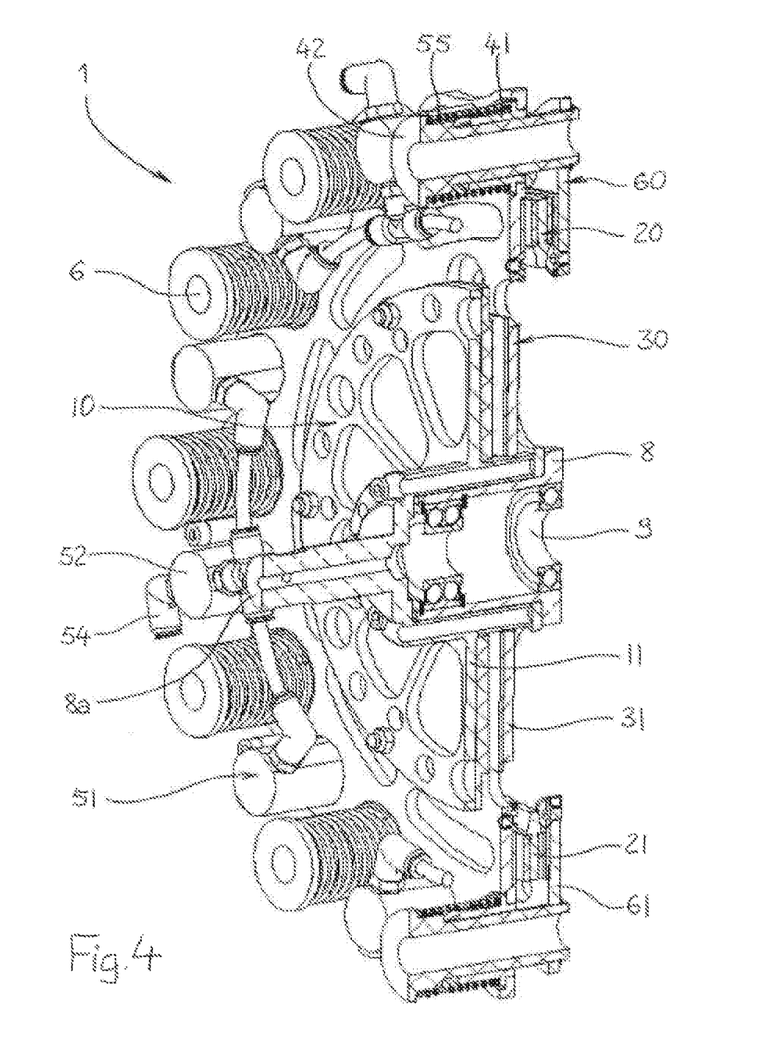
FIG. 4 shows the internal structure of the braking device in a perspective and partially sectioned view.

Referring to FIG. 4, the selection member 30 also resembles a disk 31, even though the selection member 30 has a form which is more annular, since it is not connected to a central element, but to a relatively peripheral portion of the frame 2. In its direct connector, the selection member 30 is positioned axially between the two rotating member 10, 20 and extends in a plane perpendicularly to the axis of rotation of the reel 20 so that its friction surfaces 32, 33 are positioned directly facing those respective surfaces 12, 22 of the two rotating members 10, 20. The selection member 30 is moreover mounted rotationally fixed in the frame in relation to rotation of the two rotating member 10, 20.

Figure 5:
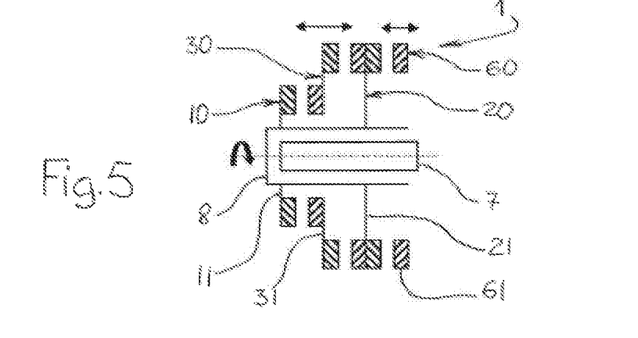
FIGS. 5 to 7 illustrate schematically the operating principle of the braking device.
Figure 6:
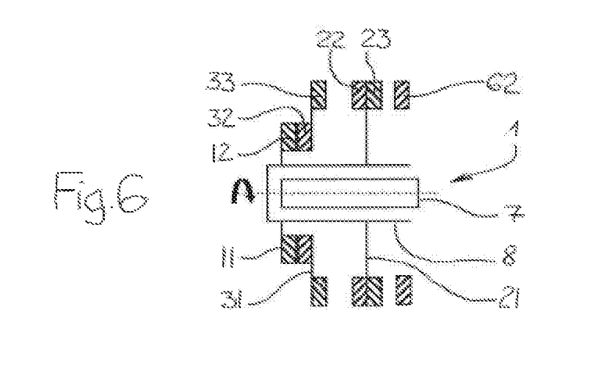
Figure 7:
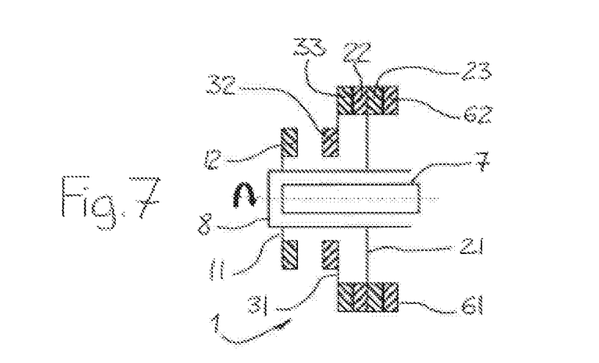

As illustrated in the three schematic diagrams shown in FIGS. 5 to 7, the selection member 30 is mounted axially displaceably, on the one hand, between a passive position where it is located at distances from either of the rotating members 10, 20 (FIG. 5) and a first active position where it cooperates by means of friction with one of the two rotating members 10 (FIG. 6), and on the other hand, between the passive position (FIG. 5) and a second active position where it cooperates by means of friction with the other rotating member 20 (FIG. 7). Both the movement and the displacement path of the selection member 30 may be of any known nature.

In a particularly advantageous arrangement, the selection member 30 is arranged between the two rotating members 10, 20 and is mounted so as to be displaceable parallel to the axis of rotation of the rotating members 10, 20. The arrangement of the selection member 30 in an intermediate position ensures minimal overall dimensions of the braking device 1, while its mobility may be achieved with particular ease since a linear or curvilinear displacement constitutes a movement which can be guided in a relatively simple manner.

In another advantageous characteristic feature, the braking device 1 comprises guiding means 40 which guide displacement of the selection member 30 between the passive position and each active position, and between the passive positon and the first active position and between the passive position and the second active position.

Basically, displacement of the selection member 30 occurs here by sliding it along a linear path which may be parallel to the axis of rotation of the rotating members 10, 20. For this reason, the guiding means 40 comprise a series of counter-bushes 41 which are fixed along the entire outer periphery of the disk 31 and which are mounted sliding in relation to bushes 42 which are themselves capable of sliding along the struts 6 of the frame 2.

According to another particular feature of the invention, the braking device 1 also comprises a motor 50 which displaces the selection member 30 between the passive position and each active position. The advantage of mechanizing the displacement of the selection member 30 is the possibility of automating operation of the braking device 1.

In a particularly advantageous manner the motor 50 is able to push the selection member 30 against each rotating member 10, 20 with a variable pressure. Owing to this characteristic, the braking torque of each type of brake available may be modulated in order, for example, to control more precisely the tape tension in the case of the slowing-down brake or provide a certain degree of impetus in the case of a stopping brake.

In this embodiment, several pneumatic actuators 51, operable to cause displacement of the selection member 30 towards the rotating member 10, are associated with a one or a series of return springs 55, which act together to tend to permanently push the selection member 30 towards the rotating member 20.

Basically, the different actuators 51 are fixed via their bodies 52 over the entire outer periphery of the disk 31, alternating relative to the struts 6 (FIG. 4). The telescopic stems 53 of these actuators 51 are positioned so as to be able to rest on a rotationally fixed element, in this case, a complementary friction member 60 which will be described further below. All the actuators 51 are moreover connected to a common compressed-air source via their end connectors 54.

The return springs 55 are also distributed over the outer periphery of the disk 31, in that each of them is mounted around one of the struts 6 of the frame 2. Working under compression, each return spring 55 exerts a repulsive force between the bush 42 which is fixed to the complementary friction member 60 and the counter-bush 41 which is fixed to the rotating member 30, the bush 42 being mounted sliding in relation to the counter-bush 41 which is itself mounted sliding along the strut 6.

The assembly is arranged in such a way that the simultaneous operation of the actuators 51 causes the pressing of different telescopic stems 53 against the complementary friction member 60 and then sliding of the counter-bushes 41 along the bushes 42, and therefore displacement of the disk 31 towards the disk 10. On the contrary, the simultaneous retraction of the different actuators 51 releases the action of the return springs 55, this causing sliding in the opposite direction of the counter-bushes 41 along the bushes 42 and therefore displacement of the disk 31 towards the disk 20.

According to another particular feature of the invention in FIGS. 5 and 7, the braking device 1 is moreover provided with a complementary friction member 60 which cooperates by friction with the rotating member 20 when the selection member 30 also cooperates by means of friction with this same rotating member 20 (FIG. 7). Operation of the complementary friction member 60 occurs substantially at the same time as that of the selection member 30. Their respective actions may thus be combined, significantly increasing the braking power. The use of a complementary friction member 60 is therefore more suited for an emergency brake than for a slowing-down brake.

A braking device 1 according to the invention may be provided with several complementary friction members 60, it being perfectly possible for several complementary friction members 60 to cooperate simultaneously with a same rotating member 10, 20 or for a same complementary friction member 60 to cooperate selectively with either one of the rotating members 10, 20.

In this particular embodiment, the complementary friction member 60 is arranged facing the rotating member 20 with which it is associated and is mounted displaceably parallel to the axis of rotation of the rotating member 20 (FIG. 5). This mobility occurs between a passive position where the complementary friction member 60 remains at a distance from the rotating member 20 (FIGS. 5 and 6) and an active position where it cooperates by means of friction with the rotating member 20 (FIG. 7).

In a particularly advantageous manner, the assembly is arranged so that, in an active position, the complementary friction member 60 and the selection member 30 cooperate by means of friction with the rotating member 20 on two friction surfaces 22, 23, respectively, which are situated substantially opposite. This configuration has the advantage of distributing the braking pressure on either side of the rotating member 20. This allows the braking efficiency to be improved significantly, this being all the greater the higher the relative torques reached in the case of a stopping brake.

In this embodiment, the complementary friction member 60 is in the form of a disk 61 which is mounted rotationally fixed in relation to the rotating member 20, but which is mounted so as to be displaceable parallel to the axis of rotation of the rotating member 20 (FIG. 5). This mobility during displacement is guided by means of bushes 42 which are fixed in the region of its outer periphery and which are able to slide along the struts 6 of the frame 2.

In accordance with another advantageous characteristic feature, the braking device 1 is able to cause displacement of the complementary friction member 60 between its passive position and its active position, when the selection member 30 is displaced between its passive position and its active position.

In this embodiment, displacement of the disk 61 is in fact directly linked to that of the disk 31, considering that the actuators 51 which are fixed to the disk 31 press against the disk 61, while the compression springs 55 exert their action between the bushes 42 which are fixed to the disk 61 and the counter-bushes 41 which are fixed to the disk 31.

In the passive position, the disk 61 is kept at a distance from the disk 31 by the actuators 51 in the working condition. The gradual retraction of the actuators 51 also gradually releases the action of the return springs 55, causing displacement of the disk 61 towards its active position. Once this position is reached, the disk 61 is kept in contact with the disk 31 by the sole return springs 55. The actuators 51 may however be activated slightly so as to modulate the pressure exerted. As regards the return of the disk 61 into the passive position it has the effect of gradually canceling out the action of the return springs 55 owing to gradual operation of the actuators 51.

Preferably, each rotating member 10, 20, the selection member 30 and, if necessary, each complementary friction member 60 cooperate by means of friction via friction surfaces 12, 22, 23, 32, 33, 62 which extend in respective planes substantially perpendicular to the axis of rotation of the rotating members 10, 20.

Moreover, the respective friction surfaces 12, 22, 23, 32, 33, 62 of each rotating member 10, 20, of the selection member 30 and, if necessary, of each complementary friction member 60 have substantially annular forms. As a result of this characteristic feature, it is possible to maximize the friction surfaces 12, 22, 23, 32, 33, 62 involved and therefore optimize the braking action, all the frictional forces being generated by relative movements of the rotational type.

The invention also relates to any reel-holder unit 100 designed to support at least one tape reel 220 and comprising at least one braking device 1 such as that described above. However, even more broadly, the invention also relates to any machine for printing a series of flat sheet-like elements, by means of stamping at least one stamping tape prepared in reel form, which comprises at least one braking device 1 such as that described above.

The invention claimed is:

1. A braking device for braking rotation of a tape reel mounted rotatably about an axis of the reel, wherein the braking device comprises:
   two rotating members mounted rotatably at the axis and rotationally coupled with the reel; and
   a selection member configured to cooperate by friction selectively with one or the other of the rotating members, the selection member being supported non-rotatably with respect to rotation of the rotating members, and
   wherein the selection member is mounted to be displaceable between a passive position located at a distance from either of the rotating members and a first active position where it cooperates by friction with one of the two rotating members and between the passive position and a second active position where it cooperates by friction with the other of the two rotating members.

2. The braking device according to claim 1, wherein the selection member, which is arranged between the two rotating members, is mounted displaceably to move parallel to the axis of rotation of the rotating members between the passive position and each of the first and second active positions.

3. The braking device according to claim 1, further comprising:
   a guide configured to guide the displacement of the selection member between the passive position and each of the first and second active positions.

4. The braking device according to claim 1, further comprising:
   pneumatic actuators and return springs configured and operable to displace the selection member between the passive position and selectively each of the first and second active positions.

5. The braking device according to claim 4, wherein the pneumatic actuators and return springs are further configured to push the selection member, when the selection member is at each of the first and second active positions, against each of the first and second rotating members with a variable pressure.

6. The braking device according to claim 1, further comprising:
   at least one complementary friction member configured and operable to cooperate by friction with at least one of the two rotating members when the selection member also cooperates by friction with the at least one of the two rotating members.

7. The braking device according to claim 6, wherein each complementary friction member faces the rotating member with which it is associated, and each complementary friction member is mounted to be displaceable parallel to the axis of rotation of the rotating member with which it is associated, between a passive position where it remains at a distance from the rotating member with which it is associated and an active position where it cooperates by means of friction with the rotating member with which it is associated.

8. The braking device according to claim 6, wherein the at least one rotating member has two opposite faces; and
   each of the complementary friction member and the selection member cooperate by friction with the at least one rotating member on respective ones of the two opposite faces of the at least one rotating member.

9. The braking device according to claim 8, wherein each of the rotating members, the selection member and each complementary friction member cooperate by friction via respective friction surfaces thereof which extend in respective planes perpendicular to the axis of rotation of the rotating members.

10. The braking device according to claim 9, wherein the respective friction surfaces of each rotating member, of the selection member and of each complementary friction member have annular forms.

11. The braking device according to claim 6, further comprising:
   pneumatic actuators and return springs configured to displace each complementary friction member between a first passive position into a first active position thereof when the selection member is displaced between a second passive position and a second active position.

12. The braking device according to claim 1, wherein the two rotating members are mounted rotationally integral.

13. A reel-holder unit configured to support at least one tape reel comprising at least one braking device according to claim 1.

14. A machine configured for printing a series of flat sheet-like elements by stamping at least one stamping tape in the form of a reel, the machine comprising at least one braking device for the reel according to claim 1.

15. The braking device according to claim 1, wherein:
the selection member has opposite faces;
each rotating member has a side thereof with a friction surface facing a respective one of the opposite faces of the selection member; and
the friction surface of one rotating member and a respective first facing face of the selection member and the friction surface of the other rotating member and a respective second facing face of the selection member, cause different degrees of friction when engaged such that engagement of the friction surface of the one rotation member and the first facing face of the selection member causes a first friction braking of the one rotation member and with it of the reel, and engagement of the friction surface of the other rotation member and the second facing face of the selection member causes a second friction braking of the other rotation member and with it of the reel.

16. The braking device according to claim 15, wherein the braking device, the friction surfaces of the rotating members, and the faces of the selection member are configured so that the first friction braking causes more gradual slowing of the reel than the second friction braking.

17. The braking device according to claim 15, wherein
the opposite faces of the selection member are on opposite sides thereof;
each of the opposite sides of the selection member has a respective friction surface thereon;
the one rotation member has the friction surface thereof facing a first one of the friction surfaces of the selection member located on the first facing face of the selection member, and the other rotation member has the friction surface thereof facing a second one of the friction surfaces of the selection member located on the second facing face of the selection member;
the one rotation member has a second friction surface on the opposite side of the one rotation member from the friction surface of the one rotation member facing the first one of the friction surfaces of the selection member;
at least one complementary friction member has a respective friction surface facing the second friction surface of the one rotation member; and
the braking device is configured for driving the complementary friction member friction surface into frictional engagement with the second friction surface of the one rotation member when the selection member also cooperates by friction with the one rotation member.

* * * * *